Jan. 4, 1966 L. T. McGEE 3,226,860
SCRAPER BLADE MOUNT FOR TRACTORS
Filed April 2, 1962 2 Sheets-Sheet 1
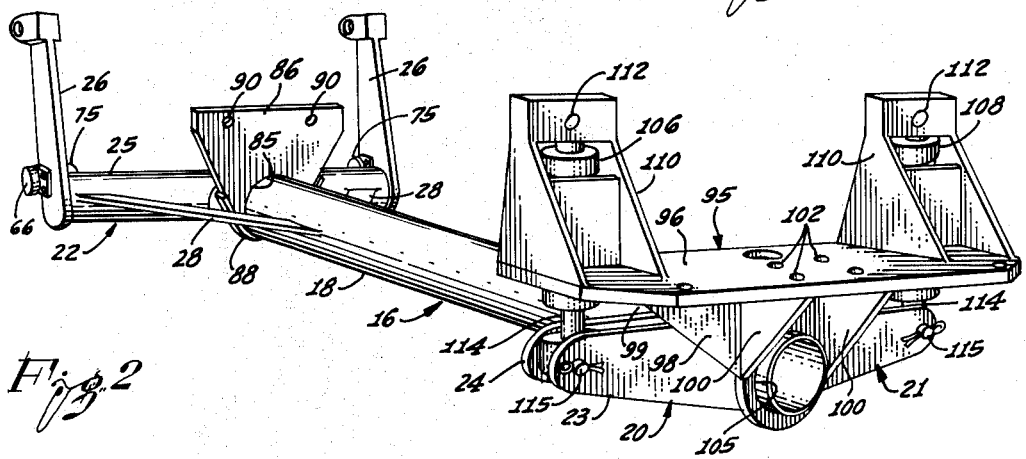
Fig. 1
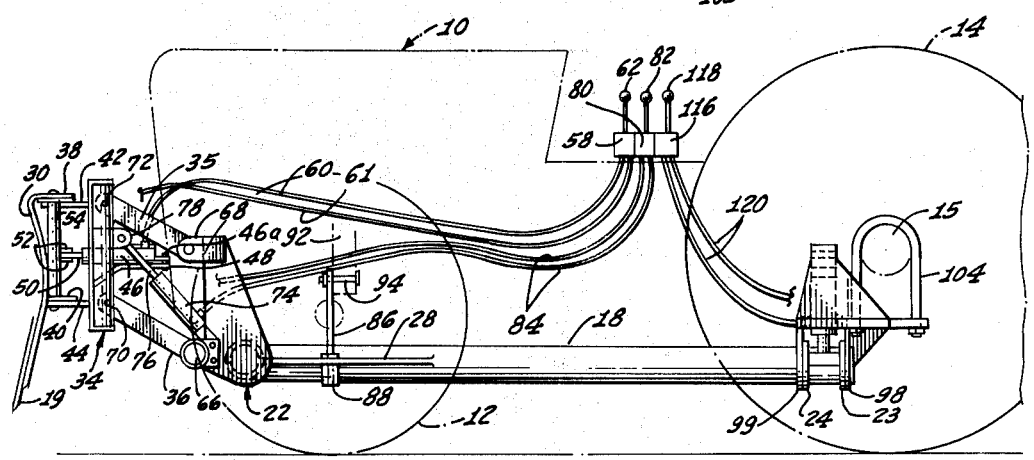
Fig. 2
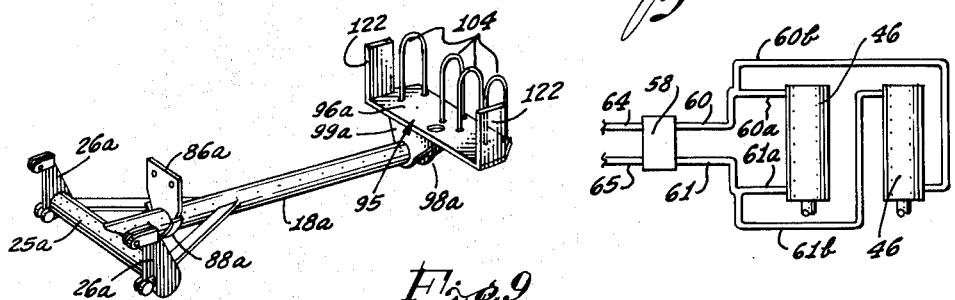
Fig. 3
Fig. 9
INVENTOR:
Leland T. McGee
By Smyth, Rooton & Pavitt
Attorneys Jan. 4, 1966  L. T. McGEE  3,226,860
SCRAPER BLADE MOUNT FOR TRACTORS
Filed April 2, 1962  2 Sheets-Sheet 2
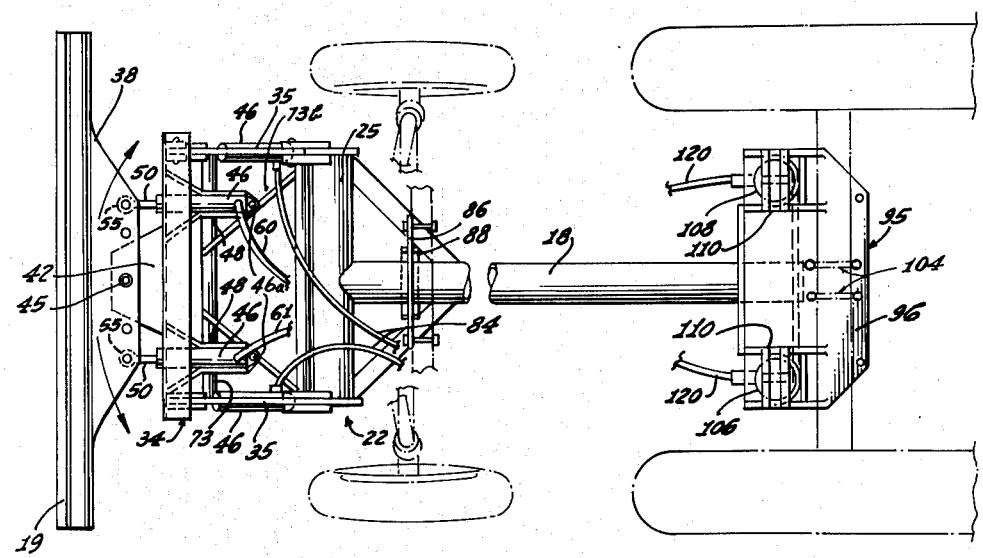
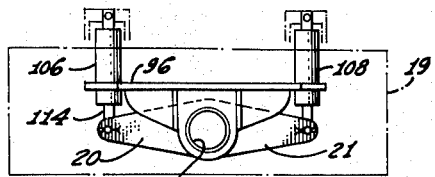
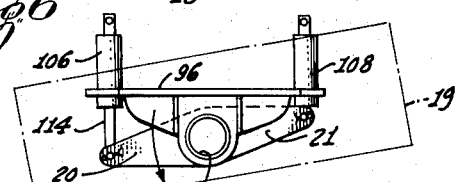
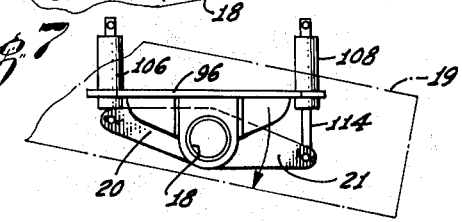
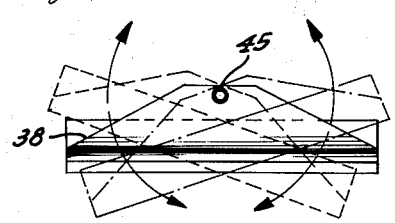
INVENTOR:
Leland T. McGee
Attorneys

United States Patent Office 3,226,860
Patented Jan. 4, 1966

3,226,860
SCRAPER BLADE MOUNT FOR TRACTORS
Leland T. McGee, 410 Dixon Ave., Compton, Calif.
Filed Apr. 2, 1962, Ser. No. 184,388
6 Claims. (Cl. 37—155)

This invention is directed to an assembly for mounting a scraper blade on a tractor to enable the tractor to function as a bulldozer.

The problem solved by the invention is not only to make such a tractor blade adjustable both in elevation and in angle but also to provide a mounting structure for transmitting the reaction forces of the scraper blade to the tractor structure in an efficient manner without creating undesirable or destructive stresses in the tractor itself.

One prior art approach to this problem is to provide a mounting structure for the scraper blade, which mounting structure is attached to the front axle of the tractor with brace bars extending rearward to the tractor in the region of the pivotal connections of the radius rods of the tractor. Such an arrangement, however, does not provide for lateral tilt adjustment of the scraper blade relative to the front axle. In fact, with the necessity of providing adequate room for the front wheels of the tractor to turn there is insufficient available space to accommodate any practical tilt adjustment mechanism for the scraper blade. Consequently the orientation of the scraper blade with respect to lateral tilt is governed solely by the front axle. It is apparent, then, that if the tractor is headed onto lateral sloping ground, the front axle tilts the scraper blade to an angle parallel with the slope and thus prevents the scraper blade from making a level cut into the slope.

Another prior art approach to the problem is to mount the scraper blade on the front end of a frame structure comprising two laterally spaced metal tubes of relatively small cross section. The two spaced metal tubes extend under the length of the tractor longitudinally thereof with the rear ends of the two tubes anchored to the rear of the tractor. Forward portions of the two tubes are rigidly connected to a forward upright bracket plate and the upright bracket plate, in turn, is rigidly connected to the tractor engine. This second prior art arrangement makes the tilt of the scraper blade depend somewhat on the rear wheels of the tractor but at the cost of the forward bracket plate applying both severe thrust forces and severe twisting forces to the tractor engine. The resulting stressing of the engine tends to throw the main engine bearings out of line and also tends to loosen the engine gaskets.

The preferred embodiment of the present invention completely solves the problem by mounting the scraper blade on a rigid frame structure that extends under the tractor longitudinally thereof with the rigid frame structure connected to the rear half of the tractor by thrust bearing means and with the forward portion of the rigid frame structure suspended from the tractor engine by additional forward bearing means that is slidable longitudinally of the rigid frame structure. The outstanding advantage of this arrangement is that the scraper blade may be tilted laterally in complete independence of the whole tractor structure with no possibility whatsoever of the forward bearing means transmitting either thrust or twisting force to the tractor engine.

In the preferred practice of the invention, suitable hydraulic means adjustably rocks the rigid frame structure about its longitudinal axis under remote control for lateral tilt adjustment of the scraper blade. This tilt control is made possible by the concept of placing the hydraulic actuating means on the rear half of the tractor where adequate space is available. Making the tilt of the scraper blade independent of the rear wheels of the tractor as well as independent of the front wheels, permits the scraper blade to make a leveling cut when the tractor is driven on laterally sloping ground. In addition, provision is made for raising and lowering the scraper blade by remote control and similar provision is made for turning the scraper blade about an upright axis to various angles relative to the direction of travel of the tractor.

The basic concept of the invention makes it possible to embody the mounting structure in a relatively simple assembly and, in addition, makes it possible to fabricate the assembly in advance in the form of a unit accessory that may be simply bolted to the tractor. In the preferred practice of the invention the rigid frame structure that extends under the tractor comprises simply a single long beam in the form of a heavy metal cylinder or tube. One important advantage of such a simplified rigid frame structure is that it may be mounted directly on the understructure of a tractor that is equipped with a back hoe. A back hoe is customarily mounted on the understructure of a tractor by a pair of spaced longitudinal channels and there is adequate room between the two channels for the heavy metal tube of the present invention.

The various features and advantages of the invention may be understood from the following detailed description and the accompanying drawings.

In the drawings, which are to be regarded as merely illustrative:

FIG. 1 is a perspective view of the presently preferred embodiment of the unitary assembly, the scraper blade and the specific means for mounting the scraper blade on the unit being omitted for clarity of illustration;

FIG. 2 is a side elevation of the complete unit as mounted on a tractor, the tractor being indicated in phantom;

FIG. 3 is a diagram of the hydraulic system for lateral tilt of the scraper blade;

FIG. 4 is a plan view of the installed mounting unit with the tractor shown in phantom;

FIGS. 5, 6 and 7 are end elevational views illustrating the manner in which the rigid frame structure is hydraulically rocked for lateral tilt adjustment of the scraper blade;

FIG. 8 is a simplified fragmentary plan view illustrating the manner in which the scraper blade is swingable about an upright axis to various angles relative to the path of travel of the tractor; and FIG. 9 is a perspective view of a second embodiment of the invention which omits the hydraulically controlled tilt adjustment of the scraper blade.

In the drawings illustrating the presently preferred embodiment of the invention, FIG. 1 shows in perspective the major portion of the prefabricated unit of the invention and FIGS. 2 and 4 show how the installed unit is related to a tractor. The tractor has an engine 10, a pair of front wheels 12 and a pair of rear wheels 14, the rear wheels being mounted on axles in a rear axle housing 15.

The rigid longitudinal frame structure of the unit, which is generally designated by the numeral 16, comprises, in this instance, a longitudinal beam in the form of a heavy metal tube 18 with a pair of oppositely extending lateral rocker arms 20 and 21 fixedly mounted on the rear end of the metal tube. A yoke, generally designated 22, is mounted on the front end of the metal tube 18 to carry a suitable scraper blade 19. Each of the two rocker arms 20 and 21 comprises a spaced pair of transverse metal plates 23 and 24 welded to the longitudinal metal tube 18. The yoke 22 comprises a heavy transverse metal tube 25 welded to the front end of the longitudinal metal tube 18 and a pair of upwardly extending arms 26, the yoke being braced by a pair of diagonals 28.

The usual mold board 30 which carries the scraper blade 19 is pivotally mounted on a transverse frame 34 which, in turn, is mounted on the yoke 22 by pairs of substantially parallel links 35 and 36 on the two sides respectively of the assembly. In the construction shown the mold board 30 has a pair of rearwardly extending horizontal ears 38 and 40 which are pivotally connected to corresponding forwardly extending ears 42 and 44 of the transverse frame 34 by means of an upright pivot pin 45 (FIG. 4).

Rotational adjustment of the scraper blade about the axis of the upright pivot pin 45 is controlled by a pair of hydraulic power cylinders 46 mounted on the transverse frame 34 by brackets 48 on opposite sides of the pivot pin, the power cylinders being connected to the brackets 48 respectively by pivot means 46a. Piston rods 50 extending forward from the two power cylinders 46 respectively, are pivotally connected to the ears 52 (FIG. 2) of corresponding upright tubes 54, each of the two tubes 54 being journalled on a corresponding upright pin 55 (FIG. 4) with the opposite ends of the upright pin welded to the two ears 38 and 40. It is apparent that since the two power cylinders oppose each other they may be energized in opposite respects to swing the scraper blade adjustably about the axis of the upright pivot pin 45.

As indicated in FIG. 2, the two opposed power cylinders 46 are connected to a four-way control valve 58 by means of a pair of hydraulic hoses 60 and 61, the four-way valve having an operating handle 62. As indicated in the diagram in FIG. 3, a high pressure hydraulic supply line 64 and a return line 65 are connected to the four-way valve 58. The hydraulic hose 60 has one branch 60a that is connected to the rear end of one of the two hydraulic cylinders 46 and has a second branch 60b that is connected to the forward end of the other hydraulic cylinder. In like manner the second hydraulic hose 61 from the four-way valve 58 has a branch 61a that is connected to the forward end of the first hydraulic cylinder 46 and has a second branch 61b that is connected to the rear end of the other hydraulic cylinder. Thus the four-way valve 58 is connected to the two hydraulic cylinders 46 in opposite respects so that operation of the four-way valve in one direction causes one of the two piston rods 50 to extend and simultaneously causes the other piston rod to retract and vice-versa. It is apparent then that the scraper blade 19 may be swung in opposite directions about the pivot pin 45 by moving the operating handle 62 of the four-way valve to its opposite extreme positions and that the scraper blade may be hydraulically locked with respect to rotation about the pivot pin 45 by placing the operating handle 62 at its intermediate or neutral position.

The two lower links 36 that movably mount the transverse frame 34 on the yoke 22 are pivotally mounted on trunnions 66 (FIG. 1) on the yoke arms 26 and the two upper links 35 are mounted by pivot pins on corresponding clevises 68 that are integral with the upper ends of the two yoke arms. The two lower links 36 are connected to the transverse frame 34 by pivots 70 and the upper links 35 are connected to the transverse frame by pivots 72. It is apparent that since the links 35 and 36 on each side of the assembly are substantially parallel and substantially equal in length, the four links maintain the transverse frame 34 and the scraper blade 19 in upright position throughout the range of levels through which the scraper blade may be adjusted. The two lower links 36 on the opposite sides of the assembly are interconnected by parallel transverse tubular frame members 73 to form a unitary rectangular frame and the rectangular frame is rigidly reinforced by diagonal braces 73b. The rigidity provided in this manner keeps the transverse frame 34 from displacement laterally relative to the yoke 22 at the front end of the heavy metal tube 18.

The elevation of the scraper blade is controlled by a pair of hydraulic power cylinders 74 on opposite sides respectively of the assembly. Each of the two hydraulic power cylinders 74 is pivotally mounted at its lower end on a trunnion 75 (FIG. 1) near the lower end of the corresponding yoke arm 26 and the piston rod 76 that extends from each of the hydraulic power cylinders 74 is pivotally connected to a corresponding clevis 78 of the transverse frame 34. It is apparent that simultaneous extension and contraction of the two piston rods 76 will raise and lower the scraper blade 19. A four-way control valve 80 having an operating handle 82 is connected to the two hydraulic power cylinders 74 by a pair of hose 84 for operation of the two power cylinders simultaneously in the same respect and the two power cylinders may be hydraulically locked by placing the valve handle 82 in its neutral position.

As heretofore mentioned, the rigid frame structure 16 is journalled on the tractor for rotation about the longitudinal axis of the frame structure. For this purpose the forward portion of the heavy metal tube 18 is journalled by a bearing that is slidable longitudinally of the heavy tube. In the construction shown, this forward bearing is provided by an arcuate cut 85 in a transverse hanger plate 86 in cooperation with an arcuate metal bar 88 that is welded to the hanger plate and extends in the manner of a sling under the heavy metal tube 18. The hanger plate 86 has a pair of bolt holes 90 by means of which it may be attached to a part 92 of the tractor engine by suitable bolts 94 as indicated in FIG. 2.

The unitary assembly includes a bracket, generally designated 95 for connecting the rear end of the longitudinal frame structure to the rear half of the tractor. In the construction shown the bracket 95 comprises a heavy horizontal plate 96 and two wings 98 and 99 extending downwardly from the horizontal plate and straddling the two rocker arms 20 and 21, the two wings being reinforced by triangular gusset plates 100. The heavy horizontal plate 96 has a plurality of bolt holes 102 including bolt holes which match the existing bolt holes on a tractor that are provided for attaching a rear pull plate to the tractor. The heavy horizontal plate 96 may either replace such a pull plate or be bolted to the tractor along with the pull plate. As shown in FIG. 2 a pair of U-shaped hangers 104 made of round bars extends through a pair of the bolt holes 102 on each side of the tractor in engagement with the axle housing 15 of the tractor.

Each of the two downwardly extending wings 98 and 99 has a reinforced circular opening 105 embracing and journalling the heavy metal tube 18 and, as shown in FIG. 2, the wing 98 is in face-to-face contact with the plate 23 of the two rocker arms 20 and 21 and the wing 99 is in face-to-face contact with the other plate 24. It is apparent that the wing 98 together with the adjacent plate 23 constitutes a thrust bearing for transmitting rearward reaction forces of the metal tube 18 to the bracket 95 and the wing 99 together with the adjacent plate 24 constitutes a second thrust bearing to transmit forward reaction forces of the metal tube 18 to the bracket.

The two opposite rocker arms 20 and 21 are controlled by two corresponding hydraulic power cylinders 106 and 108. In the construction shown each of the two power cylinders 106 and 108 is mounted in a corresponding upright bracket 110 that is made of metal plate and is welded to the heavy horizontal plate 96. The upper end of each of the two power cylinders 106 and 108 is secured to the corresponding bracket 110 by a pivot 112. A downwardly extending piston rod 114 from each of the power cylinders 106 and 108 is connected to the corresponding rocker arm 20 or 21 by a pivot pin 115.

As indicated in FIG. 2 a third four-way valve 116 having an operating handle 118 is connected to the two power cylinders 106 and 108 by a pair of hose 120. The four-way valve 116 is connected to the two power cylinders 106 and 108 in the manner shown diagrammatically in the previously described FIG. 3 for operating the two power cylinders simultaneously in opposite respects.

Thus the valve operating handle 118 may be swung to its opposite limit positions to cause opposite tilt of the scraper blade 19 about the axis of the heavy metal tube 18, the operating handle at its neutral position hydraulically locking the scraper blade at whatever tilted position the scraper blade may be placed.

The manner in which the invention serves its purpose may be readily understood from the foregoing description. It is apparent that while the described assembly may be part of the factory fabrication of a tractor, a feature of the invention is that the whole assembly may be sold as an accessory unit for installation on existing tractors. To install such a unit it is merely necessary to bolt the heavy horizontal plate 96 to the rear end of the tractor and to bolt the forward hanger plate 86 to the engine and then install the four-way valves 58, 80 and 116. It is a simple matter for the operator of the tractor to manipulate the three valve handles 62, 82 and 118 to swing the scraper blade 19 laterally about an upright axis as indicated in FIG. 8, to raise and lower the scraper blade and to tilt the scraper blade laterally in both directions as indicated in FIGS. 5, 6 and 7. All of the reaction forces created by forcing the scraper blade forward against earth or rearward against earth are transmitted directly to the rear half of the tractor. The forward bearing for the heavy metal tube 18 provided by the hanger plate 86 and the metal bar 88 with this bearing slidable along the heavy metal tube 18 keeps the metal tube 18 from transmitting either thrust forces or torque forces to the engine of the tractor. It is also to be noted that with the long metal tube 18 extending under the tractor and anchored to the rear half of the tractor, there is no tendency for the front end of the tractor to rise in reaction to resistance to forward movement of the scraper blade.

FIG. 9 shows a second embodiment of the invention which is largely identical with the first embodiment as indicated by the use of corresponding numerals to indicate corresponding parts. Essentially this second embodiment differs from the first embodiment solely in the omission of tilt adjustment of the scraper blade. Thus the second form of the invention omits the previously mentioned rocker arms 20 and 21 and omits the hydraulic cylinders 106 and 108. Since the hydraulic cylinders 106 and 108 are omitted, the previously mentioned two brackets 110 are replaced by simple upwardly extending arms 122. The rear end of the long heavy metal tube 18a is rigidly welded to the two wings 98a and 99a of the bracket 95a and are thus rigidly attached to the rear half of the tractor.

This second form of the invention functions in the same general manner as the first form but does not include means for rotating the metal tube 18 about its axis for tilt control of the scraper blade. It is to be noted, however, that the rear end of the metal tube 18 is fixed relative to the rear half of the tractor. It is further important to note that the metal tube is journalled on the forward end of the tractor by the previously described bearing comprising the hanger plate 86a and the arcuate metal bar 88a. By virtue of this arrangement the orientation of the scraper blade with respect to tilt is determined solely by the two rear wheels 14 of the tractor and is independent of the tilt of the front wheels 12 of the tractor. Thus if the two front wheels of the tractor are advanced onto laterally sloping ground while the two rear wheels remain on level ground, the scraper blade will remain level and may be employed to make a leveling cut in the sloping ground.

My description in specific detail of the selected embodiments of the invention will suggest various changes, substitutions and other departures from my invention within the spirit and scope of the appended claims.

I claim:

1. In a kit for mounting a scraper blade on a tractor having a front pair of wheels and a rear axle housing to convert the tractor into a scraper, the combination of:
   rearward support structure adapted for fixed connection to said rear axle housing of the tractor;
   an elongated rigid frame structure to extend under the tractor longitudinally thereof from said rearward support structure to a point forward of the axis of the front wheels of the tractor;
   at least one radial arm on the rear end of the frame structure;
   means attaching the rear end of the frame structure to said rearward support structure, said attaching means including a thrust bearing to permit the frame structure to rotate about its longitudinal axis relative to said rearward support structure;
   means to mount the scraper blade on the forward end of the frame structure with the scraper blade forward of the front wheels of the tractor;
   power means connected to the rearward support structure and to said radial arm to exert force between said arm and said rearward support structure to rock the frame structure about its longitudinal axis to tilt the scraper blade laterally of the tractor; and
   means to journal the forward portion of said frame structure and adapted for mounting on the forward portion of the tractor to cooperate with said rearward support structure to maintain the axis of the frame structure fixed relative to the tractor and to permit the frame structure and the scraper blade to tilt laterally relative to the forward end of the tractor as determined by the connection of the frame structure with the rear axle housing of the tractor by said rearward support structure.

2. A combination as set forth in claim 1 in which said attaching means includes a first thrust bearing to take the longitudinal loading of the beam in compression and a second thrust bearing to take the longitudinal loading of the beam in tension whereby longitudinal thrusts on the beam in both directions are transmitted to the rear axle housing.

3. In a kit for mounting a scraper blade on a tractor having a front pair of wheels and a rear axle housing to convert the tractor into a scraper, the combination of:
   an elongated rigid frame structure to extend under the tractor longitudinally, said frame structure being of a length to extend from said rear axle housing of the tractor forward of the axis of the front wheels of the tractor;
   said frame structure having an upwardly extending yoke with two arms at its forward end for connection to the scraper blade;
   said frame structure having at least one lateral rigid arm near its rear end;
   rearward support structure adapted for connection to the rear axle housing of the tractor;
   means including a thrust bearing rotatably connecting the rear end of the frame structure to said rear support structure to permit rotation of the frame structure about its longitudinal axis;
   forward means journaled on the frame structure and adapted for mounting on the forward portion of the tractor to cooperate with the rearward support structure to keep the axis of the frame structure fixed relative to the tractor and to support and journal the forward end of the frame structure; and
   fluid-pressure-actuated means connected to the rearward support structure and to said rigid arm to exert force between said rigid arm and said rearward support structure to rock said frame structure about its longitudinal axis thereby to tilt the scraper blade relative to the tractor.

4. In a kit for mounting a scraper blade on a tractor having a front pair of wheels and a rear axle housing to convert the tractor into a scraper, the combination of:
   an elongated rigid frame structure to extend under the tractor longitudinally, said frame structure being of a length to extend from said rear axle housing of the tractor forward of the axis of the front wheels of the tractor;

said frame structure having an upwardly extending yoke with two arms at its forward end for connection to the scraper blade;

said frame structure having a pair of diametrically opposite lateral arms on the rear end of the frame structure;

rearward support structure adapted for connection to the rear axle housing of the tractor;

means including a thrust bearing rotatably connecting the rear end of the frame structure to said rearward support structure to permit rotation of the frame structure about its longitudinal axis;

forward means journaled on the frame structure and adapted for mounting on the forward portion of the tractor to cooperate with the rearward support structure to keep the axis of the frame structure fixed relative to the tractor and to support and journal the forward end of the frame structure;

two hydraulic power cylinders mounted on said rearward support structure and operatively connected to said two lateral arms to rock the frame structure about its longitudinal axis for tilt of the scraper blade relative to the tractor; and a four-way valve to operate said two power cylinders simultaneously in opposite respects.

5. In a kit for mounting a scraper blade on a tractor having a front pair of wheels and a rear axle housing to convert the tractor into a scraper, the combination of:

an elongated rigid frame structure to extend under the tractor longitudinally, said frame structure being of a length to extend from said rear axle housing of the tractor forward of the axis of the front wheels of the tractor;

said frame structure having an upwardly extending yoke with two arms at its forward end for connection to the scraper blade;

rearward support structure adapted for connection to the rear axle housing of the tractor;

means including a thrust bearing rotatably connecting the rear end of the frame structure to said rearward support structure to permit rotation of the frame structure about its longitudinal axis;

means to journal the forward portion of said frame structure and adapted for mounting on the forward portion of the tractor to cooperate with said rearward support structure to maintain the axis of the frame structure fixed relative to the tractor;

means including parallel linkage means pivotally connected to the arms of said yoke and also pivotally connected to the frame structure below the arms to raise and lower the scraper blade relative to the frame structure;

means pivotally connecting the scraper blade to the parallel linkage means for rotational adjustment of the scraper blade relative to the tractor about an upright axis; and fluid-pressure-actuated means connected to the rearward support structure and to the frame structure to exert force between the rearward support structure and the frame structure to rotate the frame structure about its longitudinal axis to tilt the scraper blade laterally relative to the tractor.

6. In a kit for mounting a scraper blade on a tractor having a front pair of wheels and a rear axle housing to convert the tractor into a scraper, the combination of:

an elongated rigid frame structure to extend under the tractor longitudinally, said frame structure being of a length to extend from said rear axle housing of the tractor forward of the axis of the front wheels of the tractor;

said frame structure having an upwardly extending yoke with two arms at its forward end for connection to the scraper blade;

said frame structure having a pair of diametrically opposite lateral arms on the rear end of the frame structure;

rearward support structure adapted for connection to the rear axle housing of the tractor;

means including a thrust bearing rotatably connecting the rear end of the frame structure to said rearward support structure to permit rotation of the frame structure about its longitudinal axis;

forward means journaled on the frame structure and adapted for mounting on the forward portion of the tractor to cooperate with the rearward support structure to keep the axis of the frame structure fixed relative to the tractor and to support and journal the forward end of the frame structure;

a transverse frame forward of the forward end of said frame structure;

means including parallel linkage means connecting said transverse frame to said yoke arms and to said transverse frame below the yoke arms for up and down movement of the transverse frame relative to the frame structure;

means pivotally mounting the scraper blade on said transverse frame in a pivotal manner to permit the scraper blade to swing relative to the transverse frame about an upright axis;

fluid-pressure-actuated means connected to the scraper blade and to the transverse frame to rotate the scraper blade relative to the transverse frame about said upright axis;

fluid-pressure-actuating means connected to the frame structure and to the transverse frame to exert force between the frame structure and said transverse frame to raise and lower the transverse frame relative to the frame structure; and fluid-pressure-actuated means connected to the rearward support structure and to said lateral arms of the frame structure to exert force between said rearward support structure and said lateral arms of the frame structure to rotate the frame structure about its longitudinal axis thereby to tilt the scraper blade relative to the tractor.

References Cited by the Examiner

UNITED STATES PATENTS

| | | | |
|---|---|---|---|
| 2,565,337 | 8/1951 | Allan | 37—144 |
| 2,616,191 | 11/1952 | Cook et al. | 37—144 |
| 2,648,269 | 8/1953 | Maurer | 172—276 |
| 2,651,121 | 9/1953 | Shannon | 37—144 |
| 2,722,066 | 11/1955 | Wills et al. | 37—144 |
| 2,735,200 | 2/1956 | Arps | 33—144 |
| 2,775,831 | 1/1957 | Rockwell | 37—144 |
| 3,007,265 | 11/1961 | Harris | 37—144 |
| 3,007,266 | 11/1961 | Brand | 37—155 |
| 3,018,573 | 1/1962 | McAdams | 37—144 |

FOREIGN PATENTS 164,911   8/1955   Australia.

ABRAHAM G. STONE, *Primary Examiner.*

BENJAMIN BENDETT, BENJAMIN HERSH, ARNOLD RUEGG, T. GRAHAM CRAVER,
*Examiners.*